United States Patent
Scheu

(10) Patent No.: US 11,220,448 B2
(45) Date of Patent: Jan. 11, 2022

(54) PROCESS AND APPARATUS FOR ENRICHING SILICATE IN DRINKING WATER

(71) Applicant: Krones AG, Neutraubling (DE)

(72) Inventor: Dirk Scheu, Bopfingen (DE)

(73) Assignee: Krones AG, Neuraubling (DE)

( * ) Notice: Subject to any disclaimer, the term of this patent is extended or adjusted under 35 U.S.C. 154(b) by 193 days.

(21) Appl. No.: 16/515,833

(22) Filed: Jul. 18, 2019

(65) Prior Publication Data
US 2020/0024173 A1 Jan. 23, 2020

(30) Foreign Application Priority Data
Jul. 23, 2018 (DE) .......................... 102018005796.9

(51) Int. Cl.
*B01D 37/00* (2006.01)
*C02F 9/00* (2006.01)
(Continued)

(52) U.S. Cl.
CPC ............ *C02F 9/00* (2013.01); *B01D 19/0036* (2013.01); *B01D 61/025* (2013.01); *B01D 61/08* (2013.01);
(Continued)

(58) Field of Classification Search
CPC ...... B01D 61/445; B01D 37/00; B01D 37/04; B01D 61/00; B01D 61/02; B01D 61/025; B01D 61/04; B01D 61/08; B01D 61/12; B01D 61/58; B01D 2311/06; C02F 1/20; C02F 1/42; C02F 1/441; C02F 1/4693; C02F 1/4695; C02F 1/5236; C02F 1/66; C02F 1/68; C02F 2103/007; C02F 2103/06; C02F 2103/08; C02F 5/02
See application file for complete search history.

(56) References Cited

U.S. PATENT DOCUMENTS

2004/0188352 A1  9/2004  Dey et al.
2005/0247626 A1  11/2005  Clausse et al.
(Continued)

FOREIGN PATENT DOCUMENTS

DE  19942227 A1  3/2001
DE  60132625 T2  1/2009
(Continued)

*Primary Examiner* — Allison G Fitzsimmons
(74) *Attorney, Agent, or Firm* — Finch & Maloney PLLC

(57) ABSTRACT

Disclosed is a process for enriching silicate content in drinking water that includes separating raw water via reverse osmosis into a permeate comprising demineralised raw water and a retentate comprising mineral enriched raw water. The permeate is mixed with a water glass solution comprising sodium silicate and/or potassium silicate. An ion exchange process is used to reduce the concentration of sodium and/or potassium ions in at least part of the mixture. At least part of the retentate is supplied to the mixture after reducing the concentration of sodium and/or potassium ions to provide a silicate-enriched drinking water. Also disclosed is an apparatus for producing a drinking water enriched with silicate. The apparatus includes a reverse osmosis unit, a mixing unit, an ion exchanger, and a feed unit for feeding at least part of the retentate to the mixture after reducing the concentration of sodium and/or potassium ions.

11 Claims, 2 Drawing Sheets

(51) Int. Cl.
*B01D 19/00* (2006.01)
*B01D 61/02* (2006.01)
*B01D 61/08* (2006.01)
*B01D 61/14* (2006.01)
*B01D 61/18* (2006.01)
*B01D 61/46* (2006.01)
*B01D 61/58* (2006.01)
*B67C 3/22* (2006.01)
*B01D 61/00* (2006.01)
*C02F 1/20* (2006.01)
*C02F 1/44* (2006.01)
*C02F 1/469* (2006.01)
*C02F 5/08* (2006.01)
*C02F 101/10* (2006.01)
*C02F 103/02* (2006.01)

(52) U.S. Cl.
CPC ........... *B01D 61/145* (2013.01); *B01D 61/18* (2013.01); *B01D 61/46* (2013.01); *B01D 61/58* (2013.01); *B67C 3/225* (2013.01); *B01D 2311/08* (2013.01); *B01D 2311/246* (2013.01); *B01D 2311/268* (2013.01); *B01D 2311/2653* (2013.01); *B01D 2317/025* (2013.01); *C02F 1/20* (2013.01); *C02F 1/441* (2013.01); *C02F 1/444* (2013.01); *C02F 1/4693* (2013.01); *C02F 1/4695* (2013.01); *C02F 5/08* (2013.01); *C02F 2101/10* (2013.01); *C02F 2103/02* (2013.01); *C02F 2303/04* (2013.01); *C02F 2303/18* (2013.01)

(56) References Cited

U.S. PATENT DOCUMENTS

2008/0067125 A1* 3/2008 Wilkins .................. C02F 1/442
                                                               210/641
2011/0064824 A1   3/2011 Lascoste et al.
2014/0209544 A1*  7/2014 Poffet ....................... C02F 1/66
                                                               210/749

FOREIGN PATENT DOCUMENTS

| DE | 102008052001 | | 4/2010 |
| DE | 102017010475 | A1 | 5/2019 |
| EP | 0141517 | A1 | 5/1985 |
| EP | 3483124 | A1 | 12/2017 |
| JP | H0884992 | A | 4/1996 |
| KR | 10-2012-0028108 | A | 3/2012 |
| KR | 101152895 | B1 | 3/2012 |
| KR | 20120028108 | A | 3/2012 |
| KR | 1020120115873 | | 7/2013 |
| RU | 2463059 | C1 | 10/2012 |
| WO | 2004112515 | A1 | 12/2004 |
| WO | 2010131251 | A2 | 11/2010 |
| WO | 2011009950 | | 1/2011 |
| WO | 2011009950 | A1 | 1/2011 |
| WO | 2011010188 | | 1/2011 |
| WO | 2017102913 | A1 | 6/2017 |

\* cited by examiner

PROCESS AND APPARATUS FOR ENRICHING SILICATE IN DRINKING WATER

The present disclosure relates generally to drinking water processes and more specifically to a process for enriching silicate in drinking water and a device for producing drinking water enriched with silicate.

BACKGROUND

Against the background of the increasing consumption of drinking water, which is accompanied by a decline in water quality, among other things, it is now common and often necessary to use various purification steps for the treatment of raw water in the production of drinking water. In particular, it is common practice to produce bottled drinking water by demineralising raw water, e.g. by reverse osmosis, followed by the addition of minerals. The pH value is often adjusted by adding lyes or acids during mineralisation or before reverse osmosis.

This has the advantage that a constant drinking water quality can be guaranteed even if different raw water is used. Furthermore, it is possible to specifically enrich a wide variety of additives such as minerals, which have health-promoting properties, in drinking water. The main mineral components in water are calcium, magnesium, sodium, potassium, bicarbonate, sulphate, chloride, nitrate, fluoride and silicate, which have positive effects on the human body for various reasons. For example, calcium is needed in the human body for bone formation. In particular, the element silicon, which is mainly present in the form of silicate in drinking water, has various positive properties on the human body, so that it is advantageous to absorb silicates via drinking water. For example, it is known that silicates are able to bind toxic aluminium and thus prevent or alleviate neurodegenerative diseases such as Alzheimer's (V. Rondeau, American Journal of Epidemiology, 169, 4, 2009, pages 489-496; Exley et al., Journal of Alzheimer's Disease, 10, 2006, pages 17-24).

These usual processes, in which minerals are added to demineralised raw water, which is produced, for example, using a permeate produced by reverse osmosis, are however unfavourable from a cost point of view, especially since a not inconsiderable proportion of the raw water (i.e. the retentate resulting from the reverse osmosis) is discarded. Furthermore, it is often difficult to maintain the natural sensory character of the raw water. The sensory character of the raw water depends on the mineral concentration, and the exact adjustment or restoration of the relevant mineral concentrations to the level of the raw water is difficult and inaccurate in conventional processes.

In the state of the art, further approaches are known to enrich silicon in higher concentrations in drinking water in order to supply this element to the human body in sufficient quantities. US 2014/0271995A1 shows, for example, a process for producing drinking water in which raw water is added as an SiO2 additive to achieve the desired amount of silicate in drinking water. Further, the CN104098169B reveals the addition of amorphous Si crystals as particles or powders to purified water. In general, these approaches have the disadvantage that silicon is used in the form of SiO2 (i.e. silica). Silicic acid, however, has a relatively low solubility in the acidic and neutral pH range, so that at least some complex process steps such as filter steps must be carried out in order to adjust the desired silicate content in the drinking water and remove unwanted particles.

Further, WO2011/009950 A1 and WO2011/010188 A1 reveal processes for enriching orthosilicic acid ([Si(OH)$_4$]) in drinking water, in which a reverse osmosis process step followed by electrodialysis is used to first enrich silicon in the water and then remove undesirable minerals. However, these processes are also unfavourable from a commercial point of view, since they only use the retentate (enriched with silicon) from reverse osmosis to produce drinking water, while the permeate obtained is discarded.

The US 2005/0247626 A1 discloses a process and a device for the production of calcareous water from deionized water. WO 2011/010188 A1 reveals a process for the production of water enriched with silica. WO 2011/009950 A1 reveals a process for the production of water enriched with silica. DE 10 2008 052 001 A1 discloses a procedure for water treatment.

All in all, the state-of-the-art processes have the disadvantage that drinking water with an enriched silicate content can only be produced economically on a large scale using a high level of equipment. Thus, the processes and devices known in the state of the art have the disadvantage that they are unfavourable from a cost point of view. Furthermore, it is difficult to maintain the original mineral composition in the raw water with the known methods and devices, i.e. it is difficult to keep the concentration of other minerals present in the raw water constant in the resulting drinking water. For this reason, the natural sensory character of drinking water is often not preserved.

Water glass, for example, is an alternative source of silicon to silicic acid. Water glass is defined as aqueous solutions of sodium silicate, potassium silicate and/or lithium silicate which are highly soluble in water. In particular, water glass made of sodium or potassium silicates is commercially available in large quantities and simultaneously contains the drinking water-relevant elements sodium and potassium, and could therefore potentially serve as an additive for silicate-containing drinking water. However, water glass from sodium or potassium silicates has not yet been used for the commercial production of drinking water, as this would at the same time be associated with a high increase in the sodium and/or potassium concentration in drinking water. This is undesirable from a health point of view and is also accompanied by a deterioration in sensory properties, whereby in particular the natural sensory character of drinking water is not preserved.

SUMMARY

One aspect of the present disclosure is to provide a process for enriching silicate in drinking water, whereby the drinking water can be produced cost-effectively in large-scale quantities, in accordance with some embodiments.

Another aspect of the present disclosure is a device for the production of drinking water enriched with silicate, which can be produced cost-effectively in large-scale quantities The process can be solved by the procedure set out in claim 1. Preferred forms of implementation of the procedure are defined in subclaims 2 to 9, which are also included in combination with each other. Further, some embodiments of the process can be performed by the apparatus according to claim 10. Additional embodiments of the apparatus are defined in subclauses 11 to 15, which are also included in combination with each other.

DETAILED DESCRIPTION

Figure 1:
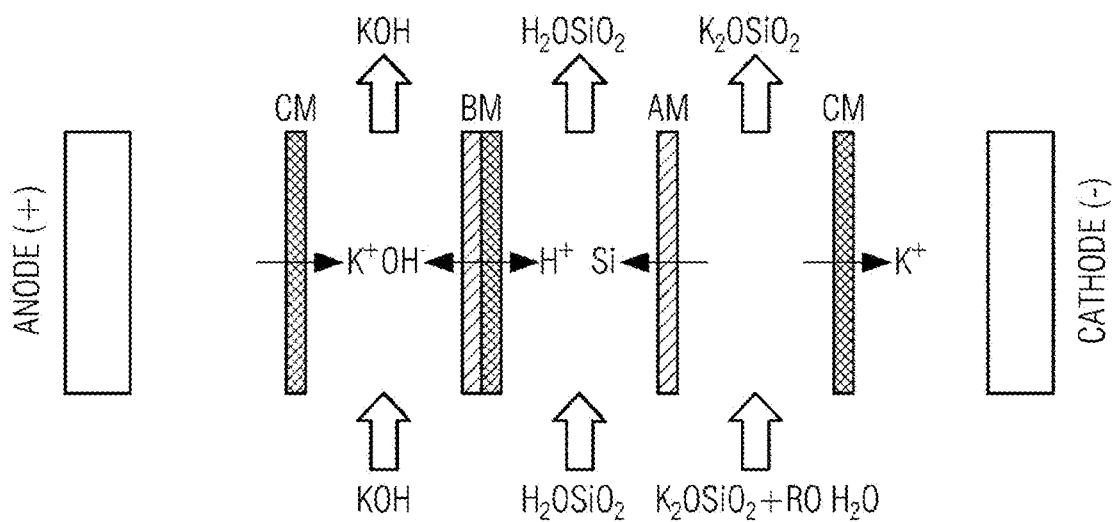
FIG. 1 schematically shows the principle of reverse electrodialysis with a cation, anion and bipolar membrane.

The process for enriching silicate in drinking water comprises the following steps: Separating raw water via a reverse osmosis process into a permeate comprising demineralised raw water and a retentate comprising mineral enriched raw water; mixing the permeate and a water glass solution comprising sodium and/or potassium silicate; subjecting at least a portion of the mixture to an ion exchange process to reduce the concentration of sodium and/or potassium ions; and supplying at least a portion of the retentate to the mixture with reduced concentration of sodium and/or potassium ions to obtain silicate-enriched drinking water.

According to the present disclosure, the raw water is separated by reverse osmosis (OR) into a permeate and a retentate. Reverse osmosis processes are known in the state of the art, so that suitable devices and process parameters are known to the average expert. The permeate comprises demineralised raw water that is separated from the retentate (i.e. the portion of water that has a high concentration of minerals after reverse osmosis).

The term "demineralised raw water" in the sense of this disclosure means pure water which has a total solids content of preferably 5 ppm or less. The total solids content corresponds to the dry residue. Typically, reverse rososis is carried out in such a way that the permeate makes up approx. 40 to 99% by volume and the retentate approx. 1 to 60% by volume, preferably 45 to 95% by volume permeate and 5 to 55% by volume retentate, more preferably approx. 60 to 90% by volume permeate and 10 to 40% by volume retentate of the total volume of raw water used. In particular, the volume ratio is preferably set to 75 vol. % permeate and 25 vol. % retentate. Raw water according to the present disclosure is e.g. groundwater, surface water or river water. In general, all types of raw water that are not harmful to humans or animals can be used.

The term "water glass solution" according to the present disclosure defines an aqueous solution comprising sodium and/or potassium silicate and is preferably a saturated solution. In the forms, the concentration of sodium and/or potassium silicate in the water glass solution is 1 mol/l or greater, preferably 2 mol/l or greater, more preferably 3 mol/l or greater, preferably greater than 3.2 mol/l. The production of such water glass solutions is state of the art and is not further described here.

By mixing the permeate and the water glass solution, comprising sodium and/or potassium silicate, a mixture is produced whose silicate concentration can be selectively enriched depending on the mixing ratio, so that drinking water with enriched silicate content results. Preferred mixing ratios of water glass solution to water (permeate) are between 1:10 and 1:10000, preferably 1:100 to 1:5000, more preferably 1:184 to 1:3061.

However, the mixture of the permeate, i.e. the demineralised raw water, and the water glass solution has a very high concentration of sodium and/or potassium ions, so that the mixture, at least at relevant mixing ratios with regard to the silicate content, is only conditionally suitable as drinking water without subsequent treatment, as this would be accompanied by undesirable sensor technology. For this reason, according to the disclosure, at least part of the mixture is subjected to an ion exchange process in order to reduce the concentration of sodium and/or potassium ions, i.e. to adjust the desired concentration of sodium and/or potassium ions in the resulting drinking water.

All common ion exchange processes can be used as invented. Examples include processes based on the use of column exchangers, DC exchangers, countercurrent exchangers, stratified bed exchangers, multi-chamber exchangers, mixed bed exchangers, double flow exchangers or sandwich exchangers. The type of materials that can be used is not limited and includes e.g. synthetic resins, clay minerals or zeolites. Furthermore, the ion exchange process can be carried out by electrochemical processes using membranes, in particular reverse electrodialysis and/or electroionisation.

The term 'ion exchange process' used in this disclosure covers all processes capable of removing cations, and in particular sodium and/or potassium ions, from the mixture of demineralised raw water and the water glass solution and replacing them with H+. The concentration of anions, such as silicate, is not changed by the ion exchange process.

The pH value of the water glass solution or the mixture of the demineralised raw water and the water glass solution is preferably in the alkaline range, such as pH 9 or higher, as this causes a higher solubility of the sodium and/or potassium silicate. So the solubility at pH 9 or higher is 250 mg/l $SiO_2$ or more. In comparison, the solubility at neutral or acid pH is lower, e.g. approx. 150 to less than 250 mg/l $SiO_2$. However, the pH drops again during the ion exchange process, so that the process is preferably carried out in such a way that the resulting drinking water has a neutral pH value. This pH value shift during the ion exchange process is also the reason why it is not possible to subject a saturated water glass solution to an ion exchange process, as otherwise silicate would precipitate during the ion exchange process. With the method according to the present disclosure it is therefore necessary to mix the demineralised raw water with the water glass solution before the ion exchange process, i.e. it is not possible to remove sodium and/or potassium ions from a concentrated water glass solution and to add the mineralised raw water only after the ion exchange process.

With this process it is possible to economically produce drinking water with an enriched silicate content in large technical quantities. Furthermore, the natural sensory character of the drinking water is preserved (in the case of complete remixing with the retentate, since the composition of the raw water is not changed with regard to its mineral content, except for the enriched silicate content).

In a preferred form, the ion exchange process is reverse electrodialysis and/or electroionisation.

Reverse electrodialysis is the preferred method because it allows the particularly effective removal of sodium and/or potassium ions. Reverse electrodialysis (EDR) uses electrical voltage to separate ions according to their charge. The principle of reverse electrodialysis with a cation, anion and bipolar membrane is shown in FIG. 1. The aqueous solution of demineralized raw water (RO $H_2O$) and a water glass solution comprising potassium silicate ($K_2OSiO_2$) is divided into anions and cations via a sequence of cation membranes (CM), anion membranes (AM) and bipolar membranes (BM) by applying electrical voltage. The cation membrane is designed in such a way that only cations can permeate, while only anions can permeate through the anion membrane. Bipolar membranes split water molecules into hydrogen ions and hydroxide ions, preventing other ions from switching to the other side of the membrane. After the process has been carried out, it is separated into an acid and a base, i.e. silica and potassium hydroxide. Commercially available equipment can be used for reverse electrodialysis. Suitable EDR systems are distributed by the manufacturers MEGA a.s./Czechia or FUJiFilm Manufacturing Europe B.V./Netherlands. Reverse electrodialysis is performed according to the manufacturer's instructions.

Figure 2:
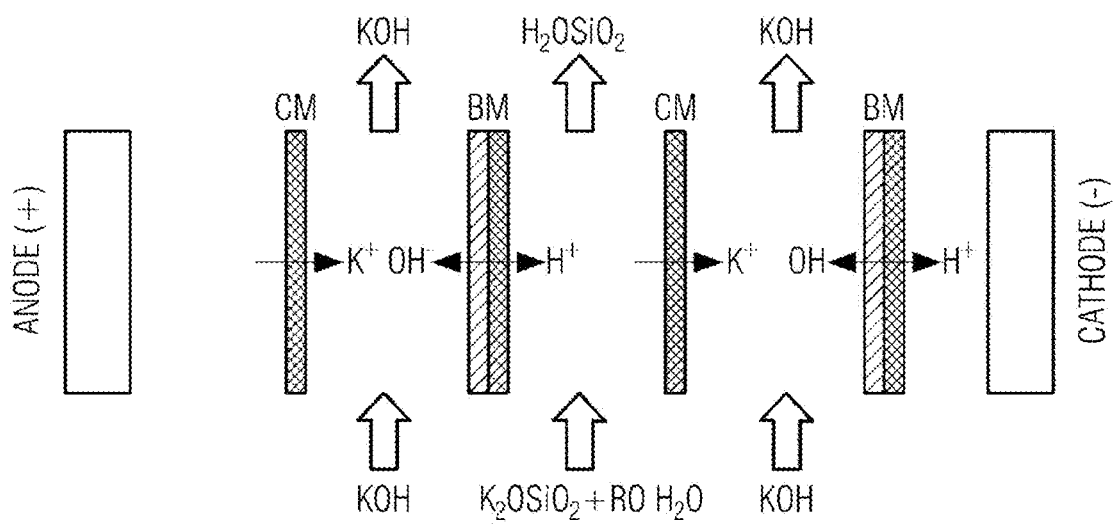
FIG. 2 schematically shows a reverse electrodialysis design using only a bipolar and/or cation membrane.

Reverse electrodialysis is carried out in a preferred form using only a bipolar and/or cation membrane. A corresponding design is shown in FIG. 2, in which only cation membranes and bipolar membranes are used. This design is advantageous because it allows the ion transfer to be carried out faster and more efficiently. Furthermore, it was surprisingly observed that unfavourable odours, which occurred in particular in a version according to FIG. 1 with alkaline pH values, were not detected in the version according to FIG. 2. Another advantage of this design is that there is no significant loss of silicate in the membrane. Furthermore, with such a membrane arrangement in an EDR system it is possible to prevent sulfate ions, which can be used as electrolyte to increase conductivity, from migrating into the product.

In another version, the ion exchange process is electrodeionisation (EDI). Electrodeionization processes are state of the art. EDI with SAC resin in the H+ cycle is preferred. In EDI, regeneration takes place continuously through the applied voltage and the associated splitting of water at the bipolar membranes. Suitable EDI systems are sold e.g. by the manufacturers SnowPure Water Technologies/USA or EVOQUA Water Technologies LLC. Electrodeionisation is carried out in accordance with the manufacturer's instructions.

The water glass solution is preferably a potassium silicate water glass solution (CAS No. 1312-76-1). Potassium silicate water glass solutions are slightly more expensive than sodium silicate water glass solutions. However, due to their specific manufacturing process, sodium silicates have the disadvantage that undesirable components, such as amines, can be present, which have a negative influence on the quality and sensory properties of the water.

The mixing of the permeate and the water glass solution is preferably carried out in such a way that the concentration of the silicate in the mixture corresponds to the final silicate concentration in the desired drinking water, taking into account a subsequent backmixing with at least part of the retentate. This is preferably in the range from 50 to 500 mg/l, more preferred from 100 to 300 mg/l, especially preferred from 130 to 250 mg/l. Such a process design is commercially preferred, as further concentration adjustments can be omitted. This simply ensures the desired increased final silicate concentration in the drinking water.

The ion exchange process is preferably performed in such a way that the resulting concentration of sodium and/or potassium ions is in the range of 0-10 mg/l, preferably in the range of 0-5 mg/l, in particular preferably in the range of 0-1 mg/l, further preferably in the range of 0-0.1 mg/l. In the forms, the concentration of sodium and/or potassium ions is 0,001 mg/l or less. Such a low concentration is preferred from a health point of view and results in natural sensory properties of the resulting drinking water.

In a preferred version of the process, a food-safe hardness stabilizer is added to the raw water before the reverse osmosis process. The addition of hardness stabilizers to the raw water has the advantage that the precipitation and deposition of metal salts, such as calcium carbonate or iron salts, is suppressed. On the one hand, this prevents undesirable deposits in process components. On the other hand, any undesirable turbidity of the resulting drinking water that may occur can be suppressed as a result of precipitated metal salt particles. If a hardness stabilizer is added, it must be a food grade hardness stabilizer according to the present disclosure. "Food safe" in the sense of this disclosure means that the hardness stabilizer can be added to drinking water without any health risk. The use of non-food-safe hardness stabilizers is not possible, as this would otherwise enter the produced drinking water via the retentate.

As food-safe hardness stabilizers, all materials can be used as invented which fulfil these conditions, i.e. which are food-safe and act as hardness stabilizers in water. Suitable, commercially available, food-safe hardness stabilizers are, for example, phosphate-based compounds. These can be added in the form of a design in a concentration up to 7 mg/l. According to the present disclosure, however, it is preferred that the food-safe hardness stabilizer is $CO_2$, as this allows an easy and cost-effective addition of $CO_2$. In addition, $CO_2$ can be easily and inexpensively removed from drinking water if still drinking water is to be produced.

In one version, the process includes one step of $CO_2$ removal after the reverse osmosis process. The removal of $CO_2$ is preferably carried out after the step of adding the retentate to the mixture with reduced concentration of sodium and/or potassium ions. Such a process design allows $CO_2$ to be quickly and effectively removed from drinking water.

In a preferred version, drinking water with a high silicate content is still drinking water. With regard to the use of $CO_2$ as a hardness stabilizer, this means that the process also includes a step in the removal of $CO_2$ via vacuum degassing, pressure degassing or membrane degassing. A combination of these degassing processes is also possible according to the present disclosure. In vacuum degassing, degassing takes place by creating a vacuum. In pressure degassing, a second gas (such as nitrogen or air) is added to the water to displace the first gas (i.e. $CO_2$). In particular, the pressure degassing is carried out by using a $CO_2$ (trickle down device), with which the surface can be increased, which is associated with an increased process speed. In addition, vacuum degassing and pressure degassing can be performed at elevated temperatures to increase process speed. Corresponding procedural arrangements are sufficiently well known and are not further explained here. If $CO_2$ removal is performed with vacuum degassing, vacuum degassing may be performed with or without the use of stripping gas. The preferred stripping gases are $O_2$, $N_2$ or other inert gases. Preferably, the pH value in the drinking water is adjusted. For $CO_2$ removal, the pH value can be used as the control variable.

In one version, the process further comprises a step of sterilizing the raw water and/or a step of sterilizing the drinking water enriched with silicate. Sterilisation is preferably carried out with a membrane separation process. However, other processes are also possible, such as UV irradiation, etc., as long as these are able to ensure the necessary disinfection, so that all the requirements for drinking water are met. This ensures that the resulting drinking water has the required water quality in every case (i.e. even if contaminated raw water is used). The membrane separation process is preferably carried out via ultrafiltration (UF), which makes particularly effective sterilisation possible. Ultrafiltration is a filtration process in which particles with specific particle sizes can be filtered. Ultrafiltration in its various forms filters particles with minimum diameters in the range from 0.05 µm to 0.005 µm. In particular, it is preferred that ultrafiltration filters particles with diameters of 0.02 µm or larger. Corresponding membrane separation processes are state of the art and will not be explained here. Nanofiltration is not possible, at least in the case of nanofiltration, since particles with very small diameters are already filtered with nanofiltration, so that ions are already separated from minerals with relatively large molecular diameters (such as $Ca^{2+}$, $Mg^{2+}$ or $SO_4^{2-}$) in the case of nanofiltration.

In addition, further purification processes for the purification or treatment of raw water can be carried out. Examples include absorption processes using activated carbon filters to separate e.g. organic compounds, biochemical processes such as denitrification of water polluted with nitrates, disinfection such as treatment with chlorine, ozone or UV radiation, as well as precipitation, flocculation, flotation, oxidation, sedimentation or screening processes.

A notable step of the disclosed process is the remixing or addition of at least part of the retentate to the mixture of permeate with the water glass solution (after the above described treatment of at least part of the mixture by ion exchange processes). In forms of execution, the process comprises the addition of at least 50 vol. %, preferably at least 70 vol. %, more preferably at least 90 vol. % of the retentate. A complete remixing is preferred, as the entire volume of the raw water used is used to produce the drinking water. Before remixing, further treatment of the retentate is optionally possible using the procedures described here, such as sterilisation, as well as other procedures, such as dilution with drinking water, etc. According to the present disclosure, however, it is preferred if the raw water used has such a quality (in particular as mineral content) that the complete retentate can be returned. This allows an extremely effective and commercially advantageous process management.

Furthermore, if required, other suitable mineral substances can be added to the drinking water in suitable concentrations. This is preferably done via the retentate. Furthermore, the addition can also take place after the retentate has been added. Methods and processes for the addition of minerals are generally known and are not explained here in detail.

The present disclosure also concerns a device for enriching silicate in drinking water. This apparatus comprises a reverse osmosis unit for separating raw water into a permeate comprising demineralized raw water and a retentate comprising mineral enriched raw water; a mixing unit for mixing the permeate and a water glass solution comprising sodium and/or potassium silicate; an ion exchanger for subjecting at least a portion of the mixture to an ion exchange process to reduce the concentration of sodium and/or potassium ions; and a feed unit for feeding at least a portion of the retentate to the treated permeate. In this way, a silicate-enriched drinking water can be obtained simply and in a continuous process.

This device is suitable for carrying out a process for the enrichment of silicate in drinking water as described above. With this device, it is possible to obtain drinking water enriched with silicate, which can be produced cost-effectively in large quantities, and which retains its natural sensory character if the concentration of other minerals is not altered compared with that of raw water (i.e. if the retentate is completely added without further treatment). Further advantages and designs of the device are described in relation to the process and also apply to the device.

The ion exchanger is preferably a component for carrying out reverse electrodialysis and/or electroionisation. A reverse electrodialysis comprising exclusively bipolar and/or cation membranes is preferred.

In another version, the device comprises a component for adding a food-safe hardness stabilizer. The component for dosing a food safe hardness stabilizer is preferably connected to the device according to the present disclosure in such a way that the hardness stabilizer is fed to the raw water before being fed into the reverse osmosis unit. This component is preferably suitable for dosing $CO_2$ as a hardness stabilizer.

According to the present disclosure, a component for removing the food-safe hardness stabilizer may be available as an option. This may be a suitable device for chemical and/or physical removal of the hardness stabiliser. Such a component is particularly useful when $CO_2$ is used as a hardness stabilizer and if the device is to be used for the production of still drinking water. If the food-safe hardness stabilizer is $CO_2$, it is preferred that the component for removing $CO_2$ is a vacuum degassing unit, a pressure degassing unit, or a membrane degassing unit, wherein the vacuum degassing unit preferably comprises a metering unit of stripping gas. The component used to remove the hardness stabilizer is preferably designed so that it can be removed after the retentate has been returned.

In the form in which it is designed, the device comprises a sterilisation unit for sterilising the raw water and/or a sterilisation unit for sterilising the drinking water enriched with silicate. The disinfection unit comprises a separation membrane, preferably an ultrafiltration (UF) membrane.

A further aspect of the present disclosure relates to a filling plant, in particular a beverage filling plant, for filling drinking water enriched with silicate, the filling plant comprising the device described above. The filling plant comprises a carousel rotating around a vertical axis of rotation with a number of identical filling stations for filling drinking water enriched with silicate, which are arranged along the circumference of the carousel. In particular, the filling system allows drinking water enriched with silicate to be filled effectively and cost-effectively into bottles.

The method and the device are particularly suitable for producing drinking water with an enriched silicate content, which is used for the treatment of neurodegenerative diseases such as Alzheimer's disease.

Figure 3:
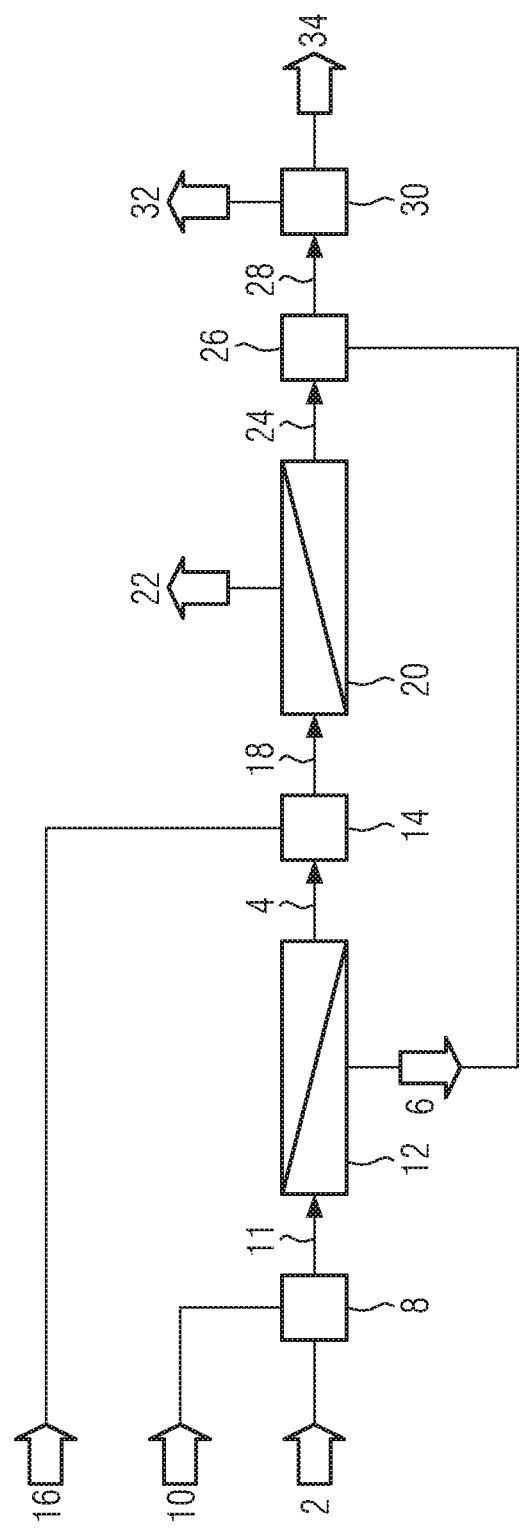
FIG. 3 shows a schematic example of an apparatus or process flow for the enrichment of silicate in drinking water.

Aspects of the present disclosure and advantages are further explained using the example shown in FIG. 3. FIG. 3 shows a schematic example of an apparatus or process stream for the production of drinking water with an enriched silicate content.

The apparatus comprises a component (8) for adding $CO_2$ (10) as a food-safe hardness stabilizer to raw water (2). The apparatus further comprises a reverse osmosis unit (12) in which the $CO_2$-enriched raw water (11) is separated into a permeate (4) comprising demineralised raw water and a retentate (6) comprising mineral enriched raw water. In addition, the apparatus includes a mixing unit (14) for preparing a mixture (18) of the permeate (4) and a water glass solution (16) comprising sodium and/or potassium silicate. The apparatus further comprises an ion exchanger (20) in which the mixture (18) can be converted via an ion exchange process into a mixture (24) having a reduced concentration of sodium and/or potassium ions and sodium and/or potassium ions (22). The apparatus also includes a supply unit (26) for supplying the retentate (6) to the mixture (24) with reduced concentration of sodium and/or potassium ions so that silicate-enriched drinking water (28) can be produced. Finally, the apparatus comprises a component (30) for removing $CO_2$ (32), namely a vacuum degassing unit comprising a metering unit of stripping gas (not shown). The apparatus also optionally comprises a sterilisation unit for sterilising the raw water and/or a sterilisation unit for sterilising the drinking water enriched with silicate (not shown).

With the apparatus according to FIG. 3, the process according to the present disclosure can be carried out as follows:

In the apparatus according to FIG. 3, raw water (2) in the component (8) is mixed with $CO_2$ (10) and the raw water (11) mixed with $CO_2$ is separated into permeate (4) and retentate (6) in the reverse osmosis unit (12). A water glass solution (16) comprising sodium and/or potassium silicate is then added to the retentate (4) in the mixing unit (14). The mixture (18) of permeate and water glass solution is transferred to the ion exchanger (20). There the concentration of sodium and/or potassium ions is reduced via reverse electrodialysis, which are carried out as potassium and/or sodium ions (22) from the ion exchanger (20). The mixture (24) with reduced concentration of potassium and/or sodium ions is transferred to the feed unit (26) in which the retentate (6) is fed to the mixture (24), thereby producing a silicate-enriched drinking water (28). $CO_2$ (32) is then removed in the component (30) via a vacuum degassing unit with $N_2$ stripping gas, whereby still drinking water (34) enriched with water is produced.

What is claimed is:

1. A process for enriching silicate in drinking water, the process comprising:
    separating raw water via a reverse osmosis process into a permeate comprising demineralised raw water and a retentate comprising mineral-enriched raw water;
    mixing the permeate and a water glass solution to result in a mixture, the water glass solution comprising at least one of sodium silicate and potassium silicate;
    subjecting at least a portion of the mixture to an ion exchange process to reduce a concentration of at least one of sodium ions and potassium ions, resulting in a mixture with a reduced concentration of sodium and/or potassium ions; and
    supplying at least part of the retentate to the mixture with the reduced concentration of sodium and/or potassium ions, resulting in silicate-enriched drinking water.

2. The process of claim 1, wherein the ion exchange process comprises at least one of reverse electrodialysis and electrodeionisation and uses only a bipolar membrane, only a cation membrane, or only a bipolar membrane and a cation membrane.

3. The process of claim 1, wherein the silicate-enriched drinking water has a silicate concentration from 50 to 500 mg/l.

4. The process of claim 3, wherein the silicate concentration is from 100 to 300 mg/l.

5. The process of claim 3, wherein the silicate concentration is from 130 to 250 mg/l.

6. The process of claim 1 further comprising adding a food-safe hardness stabilizer to the raw water prior to separating the raw water via the reverse osmosis process.

7. The process of claim 6, wherein the food-safe hardness stabilizer is $CO_2$.

8. The process of claim 7 further comprising removing the $CO_2$ after the separating the raw water via the reverse osmosis process.

9. The process of claim 8, wherein removing the $CO_2$ is performed after supplying to the mixture at least part of the retentate.

10. The process of claim 8, wherein removing the $CO_2$ is carried out by vacuum degassing, pressure degassing or membrane degassing.

11. The process of claim 1 further comprising ultrafiltration (UF) to sterilize at least one of the raw water and the silicate-enriched drinking water.

* * * * *